UNITED STATES PATENT OFFICE.

CLOYED K. BARKER, OF CINCINNATI, OHIO, ASSIGNOR OF TWENTY-ONE AND TWO-THIRDS ONE-HUNDREDTHS TO FRANK L. JANES AND TWENTY-ONE AND TWO-THIRDS ONE-HUNDREDTHS TO RUDOLPH A. MACK, BOTH OF CINCINNATI, OHIO, AND TWENTY-ONE AND TWO-THIRDS ONE-HUNDREDTHS TO FRANK S. GATES, OF GALLIPOLIS, OHIO.

PROCESS OF MAKING A COMPOSITION FOR PLUGGING TIRE-PUNCTURES.

1,128,282.     Specification of Letters Patent.     Patented Feb. 16, 1915.

No Drawing.     Application filed January 15, 1914. Serial No. 812,292.

*To all whom it may concern:*

Be it known that I, CLOYED K. BARKER, a citizen of the United States, residing at Cincinnati, in the county of Hamilton and State of Ohio, have invented certain new and useful Improvements in Processes of Making a Composition for Plugging Tire-Punctures, of which the following is a specification.

The object of this invention has been to produce a new composition designed particularly to be introduced in liquid form into a pneumatic tire or tube for the purpose of preventing escape of air from the tube in case of puncture.

The composition comprises certain ingredients mixed after a special process which also forms a part of the invention and it is contemplated to maintain a predetermined quantity of the composition or compound in an inflated body such as a tire or tube so that in the event of piercing or puncture of the latter the composition will immediately enter the puncture and adequately close the same.

The process which is hereinafter set forth in detail, for the making of the composition involves certain steps regarding treatment of each of the ingredients and mode of admixture, steps which are important to create a product suitable for the purposes of the invention.

In carrying out the invention I contemplate mixing a suitable quantity of alcohol and powdered or pulverized asbestos fiber, also pulverized charcoal. When the above ingredients have been thoroughly mixed together I add thereto a quantity of Spanish whiting, or a pigment of equivalent nature. I then add to the above several ingredients a quantity of extract of Irish moss. Before the said extract is added to the first named ingredients it is heated to the boiling point and maintained at said boiling point for a period of not less than forty-five minutes. The extract is thereupon strained and very slowly mixed with the mixture consisting of the combined quantities of asbestos, alcohol and whiting, with the intermixed charcoal.

I have found by experimentation that it is necessary for the extract of Irish moss to be heated in the manner above mentioned and mixed with the above ingredients exactly as described in order that the extract may assume a condition wherein it tends to maintain the resulting compound in a homogenous state under all conditions. In other words, the chemical action resulting from the peculiar method of heating and mixing the extract of Irish moss as described tends to prevent any liability of the elements of the asbestos fiber from collecting in lumps or balls; to the contrary this fiber has its elements maintained separate so as to assume while separated in the vehicle or binder a fibrous or web-like condition highly conducive to the best results in closing punctures in a tire or similar inflated body. I contemplate the employment of an additional ingredient for the compound where conditions warrant the use of the same, this ingredient being preferably pulverized or comminuted cork. The cork has a tendency to increase the body or mass of the compound and is desirably employed having in view the particular purposes of the invention. The final mixing of the several ingredients in the order named is accomplished by a mixing machine of any suitable type.

In order that my invention may be practised I have noted below the relative proportions of ingredients necessary to make a certain quantity of the compound: charcoal, one ounce, asbestos fiber, seven ounces, alcohol (denatured), three pints, Spanish whiting, two ounces, extract of Irish moss, two ounces in five pints of water. The said extract after being boiled in the five pints of water produces a mixture of the quantity of four pints and the several ingredients according to the above proportions will produce substantially one gallon of the compound. When pulverized cork is used, one ounce of the same is included in accordance with the foregoing description of admixture.

A particular property of my compound resides in the fact that after a predetermined quantity has been made the condition in relation to fluidity remains substantially unchanged excepting in reference to possible evaporation of alcohol and water, irrespective of variation in climatic conditions and even when the compound is subjected to the action of air. Many compounds designed for the purpose of my invention are absolutely impracticable because of their tendency to become hard, brittle, or vary in fluidity, which prevents them from moving freely within the inflated body in which they are placed, as well as interferes with their plugging or stopping action in respect to punctures or ruptures of said body.

Having thus described the invention, what is claimed is:—

The process of producing a puncture closing compound for pneumatic bodies which consists in first thoroughly mixing seven ounces of asbestos, three pints of alcohol (denatured) and two ounces of Spanish whiting, then heating two ounces of extract of Irish moss to the boiling point and maintaining the same in such heated condition for a minimum time of forty-five minutes, and then slowly mixing said extract with the first named mixture.

In testimony whereof I affix my signature in presence of two witnesses.

CLOYED K. BARKER.

Witnesses:
 H. C. ROBB,
 R. A. MACK.